J. P. HESSE.
SCREW LOCK.
APPLICATION FILED DEC. 7, 1907.
948,326.
Patented Feb. 8, 1910.
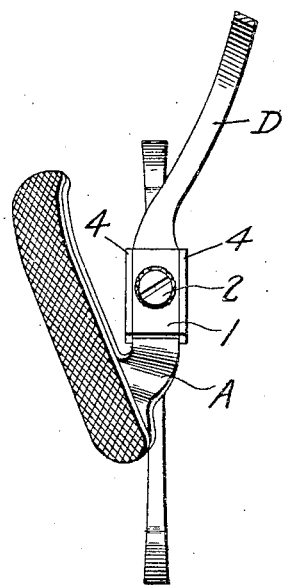
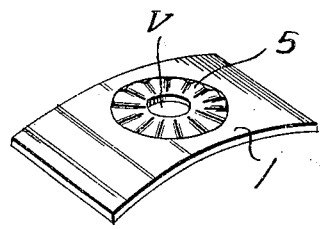
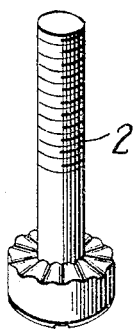
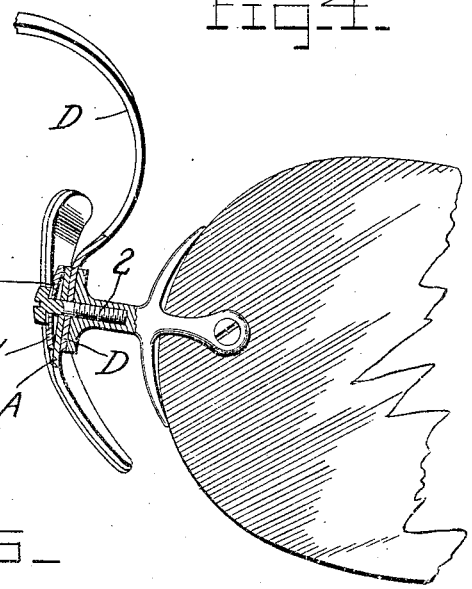
Witnesses
Inventor
John P. Hesse
By
Attorneys

UNITED STATES PATENT OFFICE.

JOHN PHILIP HESSE, OF BROOKLYN, NEW YORK.

SCREW-LOCK.

948,326.  Specification of Letters Patent.  Patented Feb. 8, 1910.

Application filed December 7, 1907. Serial No. 405,562.

*To all whom it may concern:*

Be it known that I, JOHN PHILIP HESSE, a citizen of the United States, residing at Brooklyn, in the county of Kings and State of New York, have invented certain new and useful Improvements in Screw-Locks; and I do hereby declare the following to be a full, clear, and exact description of the invention, such as will enable others skilled in the art to which it appertains to make and use the same.

This invention has relation to a new and useful screw lock.

The object of my invention is to provide a screw and keeper plate by means of which two or more members may be securely fastened without any danger or likelihood of the screw becoming accidentally displaced.

In the accompanying drawings I have shown in Figure 1 a broken portion of a pair of spectacles or eye-glasses secured by means of my invention. Fig. 2 discloses a perspective view of a washer as used in connection with the bow springs of spectacles.
Fig. 3 shows a perspective view of a screw as used in my invention. Fig. 4 shows a front view of Fig. 1. Fig. 5 is a longitudinal median section through the washer shown in Fig. 2.

The aim of my invention is more particularly to provide a securing means whereby two or more parts subjected to jarring movements or which are handled and shaken in their use, or which are subjected to strains having a tendency to loosen the screw connected parts, may be securely fastened.

In securing the nose pieces to the lens frame of an ordinarily constructed eye-glass, for instance, it is found that the screw, which has an exceedingly small head, has a tendency to work loose causing a displacement of the nose piece and a consequent inconvenience to the user of the eye-glass. In the use of my screw lock, this objection is overcome in that I provide the eye-glass with a screw 2 the underface of the head of which is corrugated or serrated as clearly shown in Fig. 3. Held upon the bow spring D of the eye-glass and between the saddle- forming shoulders 4 of the box portion of the stud as shown in Figs. 1 and 4 is a peculiarly constructed washer 1, shown in perspective view in Fig. 2 which washer is made of thin sheet steel and is bowed lengthwise while the central portion surrounding the screw perforation $v$ is dished and corrugated or serrated as disclosed. These corrugations are formed by stamping the material so that it is struck up on the under side while it is depressed on the upper side. This manner of forming the corrugations adds strength to the washer at the point at which it is most needed, that is to say, immediately surrounding the bolt hole. These corrugations 5 of the washer are adapted to register and lock with the corrugations upon the underface of the screw 2, the washer and screw head being provided with an equal number of these corrugations. In Fig. 2 the dish and the corrugations of the washer are shown.

In securing the nose piece to the eye-glass according to my invention, the bow spring D is inserted between the shoulders 4 of the box portion of the stud, then the nose pieces or wings A are next properly positioned, when the bowed, dished and corrugated washer is next positioned between the shoulders 4 as shown in Fig. 4 so that in seating the screw with the corrugated underface, this screw will engage within the corrugations of the spring dished washer so that the screw must be advanced against the tension of this washer and when this screw is brought into engagement with the washer the screw corrugations successively ride over the washer corrugations until a tight lodgment of the screw head is secured. In this condition the screw 2 is spring held and no actual dislodgment or displacement of the screw is possible as the only way the screw can be removed is to use sufficient force to force the screw corrugations over the washer corrugations to loosen the screw. This construction I use wherever two parts are to be detachably secured. As the washer 1 is securely held between the shoulders 4 the washer cannot of course move, so that the screw 2 is securely held. This construction may be used in many places and I have only set forth one specific instance in reciting the securing of the nose piece to the eye-glass.

I claim—

A spring metal washer comprising a bowed body provided with a central portion dished in the direction of the bow and having a centrally disposed bolt hole, said dished portion having serrations formed thereon and radiating from the bolt hole, said washer being made from a single strip of metal.

In testimony whereof, I affix my signature, in presence of two witnesses.

JOHN PHILIP HESSE. [L. S.]

Witnesses:
HERMAN RICHTER,
ERNEST SCHALTHEIS.